M. W. PECK.
SPRING WHEEL.
APPLICATION FILED MAR. 25, 1919.

1,410,952.

Patented Mar. 28, 1922.

Witnesses.
J. K. Moore
R. E. Barry

Inventor.
Myles W. Peck
By
Whitaker Prevost
Attys

UNITED STATES PATENT OFFICE.

MYLES WELLINGTON PECK, OF LONDON, ENGLAND.

SPRING WHEEL.

1,410,952.  Specification of Letters Patent.  Patented Mar. 28, 1922.

Application filed March 25, 1919. Serial No. 285,021.

*To all whom it may concern:*

Be it known that I, MYLES WELLINGTON PECK, a subject of the King of Great Britain, residing at 27 Northolme Road, Highbury, London, England, have invented new and useful Improvements in Spring Wheels, of which the following is a specification.

My invention relates to spring wheels of the type provided with a series of single plate or blade springs which constitute the wheel spokes, and which extend from the hub to the rim in a uniform direction.

In wheels of this type as heretofore proposed the springs are arranged in such a manner as to allow the rim, under the action of any shocks to which it may be subjected, to move in a radial direction to a position more or less eccentric to the hub.

The object of my invention is to construct a wheel of the type referred to wherein any shocks received by the rim tend to cause the rotation of the hub with relation to the rim in such a manner as to distribute the strain between all the spokes without any material relative movement of the hub and rim in a radial direction.

In a wheel constructed according to this invention the spokes are made substantially straight, instead of with considerable curvature as heretofore, and are pivotally connected to both the hub and rim in such a manner that, they are tangential to a circle passing through their points of connection to the hub whereby any shock upon the rim which will tend to bend any spoke and thereby bring its points of connection to the hub and rim respectively nearer together will cause a rotation of the hub and so produce the corresponding flexure of the other spokes without materially affecting the concentricity of the hub and rim.

My invention will be readily understood by reference to the accompanying drawing, in which:—

Figure 1:
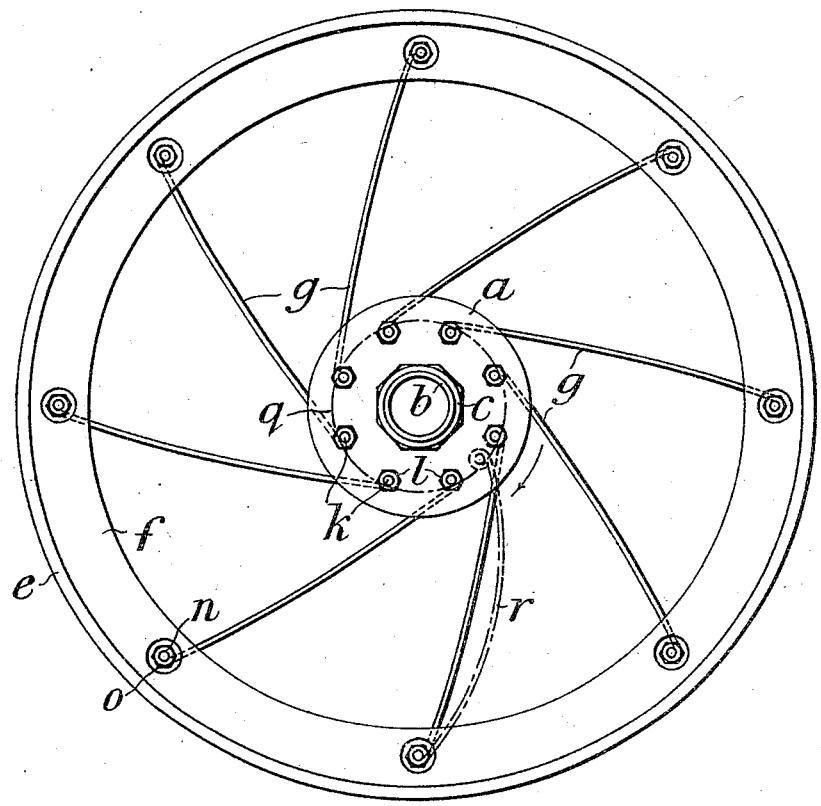
Figure 2:
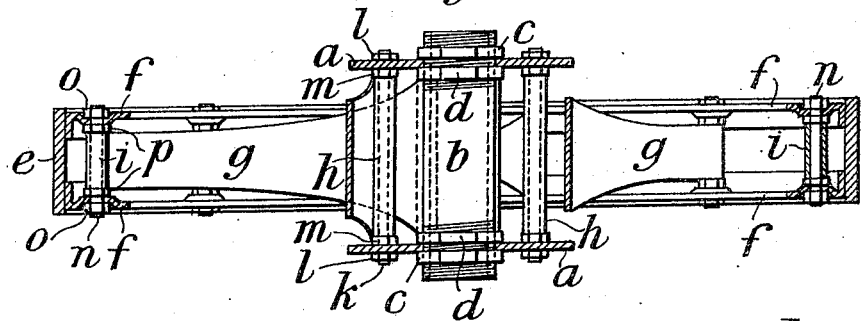

Figure 1 is a side elevation of a wheel constructed in accordance with the said invention; and, Figure 2 is a sectional plan.

As shown in the drawing the hub of the wheel is composed of two discs $a, a$, mounted upon a sleeve $b$ and held in position thereon by nuts $c, c$ and lock nuts $d, d$. $e$ indicates the rim of the wheel which, as shown, is plain, but which may be adapted to carry a pneumatic or solid rubber tyre, the said rim having on its inner face two flanges $f, f$.

$g$ are the wheel spokes which are practically straight steel plates bent at the ends to form eyes or sockets $h, i$ at the inner and outer ends respectively, the sockets $h$ being adapted to have bolts $k$ passed through them for attachment to the hub; the said bolts, as shown, are provided at each end with nuts $l$ and lock nuts $m$ on opposite sides of the discs $a, a$, whilst the sockets $h$ form distance pieces between the said discs. At the outer ends of the spokes bolts $n, n$ pass through the eyes $i$ and flanges $f, f$, nuts $o, o$ and lock nuts $p, p$ being provided for securing the said spokes to the said flanges.

It will be noticed by reference to Figure 1 that the spokes $g, g$ are not radial, but are tangential to a circle $q$ (indicated by the dotted lines in Figure 1) concentric with the wheel axis and touching the outer surfaces of the bolts $k, k$.

The plates forming the spokes $g$ are of dimensions which will enable them to support the weight which the vehicle is normally intended to carry without materially bending, but which will allow them to bend under the shocks or vibrations to which the wheel is subjected when running.

With the construction hereinbefore described it will be understood that any shock which will tend to bend one of the spokes, say, as indicated by the dotted lines at $r$ in Figure 1, will, owing to the corresponding shortening of the distance between the points of connection, tend to cause the rotation of the hub in the direction of the arrow Figure 1, so that a corresponding bend will be imparted to all the spokes and thereby distribute the shock around the whole wheel.

In practice it is advantageous to slightly bend the spokes in the direction in which they are intended to bend, as shown in the drawing, although this is not absolutely essential.

It will be understood that by constructing the spokes of a series of plates in the manner hereinbefore described the wheel possesses great lateral stability.

It will be understood that in using my wheel under normal conditions it is practically rigid and that the elasticity which the wheel possesses is very limited and only comes into play under unusual conditions. There is thus no constant motion or bending of the springs which tires them and ultimately causes them to fracture.

Having now particularly described and ascertained the nature of my said invention and in what manner the same is to be performed, I declare that what I claim is:—

1. A spring wheel comprising a hub, a rim, and substantially straight and rigid spring plates forming spokes arranged tangentially relatively to the rim and pivotally connected at their ends to the hub and rim, whereby a shock to the rim will tend to rotate the rim relatively to the hub without materially affecting the concentricity of said hub and rim.

2. A spring wheel of the kind defined in claim 1, in which the spokes are slightly curved to permit bending in the direction of their length sufficient to absorb vibrations but not curved sufficiently to permit bending to such an extent as to absorb shocks delivered to the rim.

3. A spring wheel comprising a hub, a rim, and substantially straight and rigid spring spokes arranged tangentially relatively to the rim and pivotally connected at their ends to the hub and rim, said spokes being of sufficient thickness and curvature to absorb vibrations but of unsufficient curvature to absorb shocks delivered to the rim, whereby a shock to the rim will tend to rotate the rim relatively to the hub without materially affecting the concentricity of said hub and rim.

MYLES WELLINGTON PECK.